US006926855B1

(12) United States Patent
Carrier

(10) Patent No.: US 6,926,855 B1
(45) Date of Patent: Aug. 9, 2005

(54) METHOD OF MAKING COMPOSITE DOCTOR BLADES

(75) Inventor: Gordon Eugene Carrier, East Waterboro, ME (US)

(73) Assignee: S.D. Warren Company, Boston, MA (US)

( * ) Notice: Subject to any disclaimer, the term of this patent is extended or adjusted under 35 U.S.C. 154(b) by 0 days.

(21) Appl. No.: 10/659,493

(22) Filed: Sep. 10, 2003

Related U.S. Application Data

(62) Division of application No. 09/728,183, filed on Dec. 1, 2000, now Pat. No. 6,643,890.

(51) Int. Cl.[7] ........................ B29C 70/20; B29C 70/34; B29C 43/20

(52) U.S. Cl. ...................... 264/137; 264/160; 264/257; 264/258; 264/324; 156/245

(58) Field of Search ................................ 264/257–258, 264/324, 157, 160, 136–137; 156/245

(56) References Cited

U.S. PATENT DOCUMENTS

| | | | | |
|---|---|---|---|---|
| 2,767,529 | A | 10/1956 | Scott | |
| 4,549,933 | A | 10/1985 | Judd et al. | |
| 4,978,999 | A | 12/1990 | Frankel et al. | |
| 5,085,928 | A | 2/1992 | Krueger | |
| 5,110,415 | A | 5/1992 | Boucher et al. | |
| 5,174,862 | A | 12/1992 | Hale et al. | |
| 5,783,042 | A | 7/1998 | Leeman et al. | |
| 6,416,843 | B1 | 7/2002 | Rata et al. | |
| 2002/0092634 | A1 * | 7/2002 | Rokman et al. | ............ 162/156 |

FOREIGN PATENT DOCUMENTS

| | | | |
|---|---|---|---|
| DE | 4137970 | | 5/1993 |
| JP | 05-132891 | * | 5/1993 |
| JP | 5132891 | | 5/1993 |
| JP | 5214696 | | 8/1993 |
| JP | 05-338048 | * | 12/1993 |
| JP | 5321189 | | 12/1993 |
| WO | WO-99/12726 | | 3/1999 |
| WO | WO-99/64674 | | 12/1999 |
| WO | WO-00/15904 | | 3/2000 |

* cited by examiner

*Primary Examiner*—Stefan Staicovici
(74) *Attorney, Agent, or Firm*—Briana K. O'Regan

(57) ABSTRACT

A method of making a composite doctor blade is provided. The composite doctor blade includes multiple layers of composite material including a plurality of abrasive unidirectional fibers, in which a substantial proportion of the fibers are aligned in a direction substantially parallel to the long axis of the doctor blade. The unidirectional fibers are provided in a unidirectional fabric that includes, based on fabric weight, at least 60% by weight unidirectional fibers.

21 Claims, 4 Drawing Sheets

METHOD OF MAKING COMPOSITE DOCTOR BLADES

This is a division of Application No. 09/728,183, filed Dec. 1, 2000, now U.S. Pat. No. 6,643,890.

BACKGROUND OF THE INVENTION

The present invention relates to composite doctor blades. More particularly, the present invention relates to composite doctor blades for use in papermaking, for example in calenders during the manufacture of printing paper. The term "calender" and variations thereof, as used herein, is intended to refer to an apparatus used to calender paper, including stand-alone calendering units such as supercalenders and calendering units within a papermachine such as machine calenders, gloss calenders and soft nip calenders. The present invention further relates to a method of using doctor blades in calenders.

Doctor blades are widely used to remove various materials from the surface of papermachine rolls. By its very nature, the process of removal of contaminants from the roll surface may result in significant wear to the roll surface, the doctor blade itself or both. The components of paper, particularly coating components, tend to be abrasive and tend to cause wear in the surface of the papermachine roll. Conventional doctor blades may be constructed from metal, e.g., steel, stainless steel, nickel or bronze, metal coated with alloy or ceramic material, plastic, or "composite" materials, i.e., fiber-reinforced polymeric materials. FIG. 1 shows a typical papermachine configuration wherein a doctor blade 2 is positioned against a surface 16 of a papermachine roll 12, for example a calender roll. Doctor blades typically have a 45° beveled edge 14, as shown in FIG. 1.

Metal blades generally exhibit high stiffness in the machine direction, i.e., the direction perpendicular to the rotational axis of the papermachine roll, and good wear characteristics. The machine direction of the papermaking process is generally known in the art as the direction of the paper web as it passes through the papermachine and is indicated by arrow 18 in FIG. 1. Such blades also tend to be susceptible to corrosion and to cause excessive roll wear.

Plastic blades tend to be used in papermachine locations unsuitable for metal blades. Plastic blades, however, generally have significant drawbacks because they tend to have low stiffness and tend to degrade at the temperatures typically used in the papermaking process.

Composite blades are typically formed from a plurality of fibrous layers impregnated with resin, each fibrous layer generally having a woven structure such that a certain proportion of the fibers lay in the machine direction, while the remaining fibers lay in the cross-machine direction, i.e., the direction parallel to the rotational axis of the papermachine roll. The cross-machine direction is generally known is the art as the direction perpendicular to the path of the paper web and is indicated by arrow 20 in FIG. 1. Although composite blades tend to wear more quickly than metal blades, they also tend to cause less wear on the roll surface. Reduced blade life is typically viewed as a drawback and improved wear resistance of the blade is seen as desirable for many doctoring applications. The wear characteristics of composite doctor blades are generally considered acceptable in many conventional calendering applications because excessive roll wear may deleteriously affect the final properties of the paper.

Composite doctor blades are often used with on-line calenders, which are typically run at relatively high nip pressures and high roll surface temperatures. These operating conditions tend to increase the amount of coating particles and contaminants on the calender roll surface. If the calendering rolls are not doctored on an almost continuous basis, buildup of coating particles and contaminants reach unacceptable levels, directly affecting the final product properties of the paper, such as paper gloss and paper smoothness. Moreover, the abrasiveness of the particles and contaminants tend to degrade the surface of the calender roll, causing a permanent degradation of the roll surface. Degradation in the roll surface tends to cause a deterioration of the roll profile, i.e., the roll surface is uneven which tends to cause inconsistent calendering across the width of the paper web. Thus, the demand for consistent paper quality at a high production rate and with greater efficiency has typically resulted in almost continuous doctoring of the calendering rolls during operation to remove contaminants. As a result, there have been significant efforts to increase the wear resistance and, consequently, the blade life of composite doctor blades.

The operating conditions for on-line calendering have also driven efforts to increase the wear resistance of the calendering rolls. It is becoming more common for such on-line calendering rolls to be coated with a thin layer of thermal spray coating, which typically exhibits resistance to roll surface degradation and, consequently, deterioration of the roll profile. The term "thermal spray" and variations thereof, as used herein, is intended to refer to one of three standard processes: plasma, high velocity oxygen-fuel (HVOF), and detonation gun, whereby a material, typically in powder form, is heated and deposited on a surface. The thermal spray coating tends to be a ceramic or metal matrix coating. The surface of a thermal spray coated roll may also be ground to a very low roughness, a highly desirable property for calendering rolls used in the manufacture of coated printing papers.

Thermal spray coatings tend to resist scratching from doctoring activities when such doctoring activities are performed on an intermittent basis, such as the removal of paper wrapped around a roll after a break in the paper web. A thermal spray coated roll will, however, generally exhibit roll degradation when subjected to almost continuous doctoring. Over time, thermal spray coated rolls tend to exhibit deterioration in the roll profile and surface finish caused by the action of the doctor blade and the contaminants. When the roll profile and surface finish have degraded to an extent such that the quality of the paper is adversely affected, the roll must be removed and reground. Removal for grinding can result in a significant loss to production and increased costs. In addition, the grinding process itself removes a valuable layer of thermal spray coating from the roll. Because the thermal spray coating layer of the roll tends to represent a significant portion of the cost of the roll and a significant monetary investment, minimizing the loss of thermal spray coating is highly desirable.

Efforts to increase the wear resistance of composite doctor blades may result in more rapid deterioration of the surface of the roll. On the other hand, an adequate level of wear resistance is required to minimize disruptions to production caused by the need to change doctor blades. There remains a need for a doctor blade that may be used almost continuously against the surface of a thermal spray coated roll to adequately remove surface contaminants, while exhibiting sufficient wear resistance to be practical in the production setting. There also remains a need for a doctor blade that may be used to maintain a low surface roughness of the roll with minimal deterioration of the thermal spray coating.

SUMMARY OF THE INVENTION

The inventor has discovered that a composite doctor blade that includes a plurality of unidirectional fibers, i.e., abrasive fibers aligned in a direction parallel to the long axis of the doctor blade, may be used to remove surface contaminants from the surface of a roll with minimal deterioration of the roll surface. The inventor has found that such a doctor blade may remain in substantially continuous contact with the surface of a roll during operation without significant damage to the surface of the roll.

The composite doctor blade of the invention is suitable for use in the manufacture of paper, particularly for use in calenders. The composite doctor blade of the invention provides the abrasiveness required in paper manufacturing to adequately clean roll surfaces without unacceptable deterioration of the roll surfaces. The doctor blades of the invention exhibit the structural properties required for effectual doctoring, such as stiffness in both axes of the doctor blade. The doctor blade of the invention also tends to wear slowly and uniformly. Embodiments of the doctor blade of the invention may also be used to reduce and maintain a desired level of surface roughness of the roll.

In one aspect, the invention provides a doctor blade including composite material that includes a plurality of unidirectional fibers, impregnated with a resin.

Preferred embodiments may include one or more of the following features. The doctor blade has a laminate structure including multiple layers of composite material. The unidirectional fibers are selected from the group consisting of fiberglass, ceramic, and mixtures thereof. Preferably the fibers are provided as long continuous filaments or multifilament strands. Preferably the fibers are fiberglass. The unidirectional fibers are provided in a unidirectional fabric. At least 60% by weight of the fibers in the unidirectional fabric are unidirectional fibers, preferably 75% by weight, more preferably 90% by weight. The remaining fibers, referred to herein as the secondary fibers, are oriented in a direction other than parallel to the long axis of the doctor blade. The unidirectional fibers have diameters equal to or greater than the diameters of the secondary fibers. Preferably the unidirectional fibers have diameters of about 450 to 1500 $\mu$m and the secondary fibers have diameters of about 400 to 700 $\mu$m. The unidirectional fabric further includes nonabrasive fibers selected from the group consisting of carbon, i.e., graphite, rayon, aramid, polyester and mixtures thereof. Preferably one or more of the layers of composite material includes carbon fibers aligned in a direction perpendicular to the long axis of the doctor blade. The unidirectional fabric has a weight per unit area of about 230 to 610 g/m$^2$. The impregnating resin is a thermoplastic resin or an epoxy resin, i.e., a resin containing an epoxide, oxirane or ethoxylene group. The resin has a glass transition temperature, Tg, of about 65 to 315° C., preferably 85 to 315° C. The resin further includes an abrasive additive selected from the group consisting of glass microspheres, glass fibers, crushed glass, synthetic or industrial diamond particles, silica particles, silicon carbide particles, boron particles, zirconium particles, aluminum oxide particles and mixtures thereof.

In another aspect, the invention provides a method of cleaning a roll surface including:

a) positioning a doctor blade having a long axis near the roll surface such that the long axis of the doctor blade is substantially parallel with the rotational axis of the roll, the doctor blade including a plurality of unidirectional fibers, impregnated with resin; and b) pressing a beveled edge of the doctor blade against the surface of the roll.

In another aspect, the invention features using the above described method, to decrease the roughness of a roll surface.

Preferred methods may include one or more of the following features. The beveled edge of the doctor blade remains in substantially continuous contact with the roll surface during operation. The positioning step includes the formation of an angle of about 25 to 30° between the beveled edge of the doctor blade and the roll surface, as measured from a tangent to the roll where the beveled edge touches the roll surface. The pressing step is performed at a pressure of about 85 to 700 N/m, preferably about 175 to 440 N/m. The surface roughness of the roll is reduced to about 0.025 to 0.20 $\mu$m Ra, preferably about 0.050 to 0.13 $\mu$m Ra. The surface roughness of the roll is maintained during the effective life of a blade at a level of about 0.025 to 0.20 $\mu$m Ra, preferably about 0.050 to 0.13 $\mu$m Ra.

In another aspect, the invention provides a method of making a composite doctor blade including the step of impregnating a composite material comprising unidirectional fibers.

Preferred methods may include one or more of the following features. The method includes a layering step wherein multiple layers of composite material are superimposed on top of one another to form a laminate structure. The method includes a curing step wherein the resin is subjected to an elevated temperature and pressure. The method includes a cutting step wherein the cured laminate structure is cut into two or more doctor blades, each blade having a long axis.

Other features and advantages of the invention will be apparent from the following detailed description, the drawings, and the claims.

DETAILED DESCRIPTION OF PREFERRED EMBODIMENTS

Figure 1:
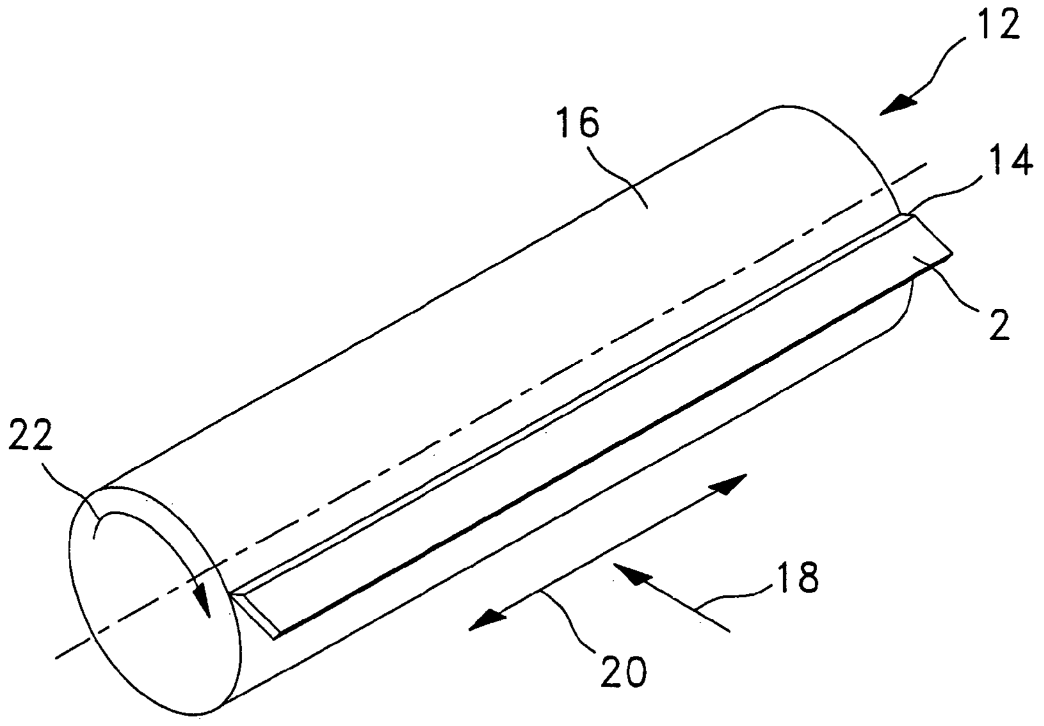
FIG. 1 PRIOR ART
FIG. 1 is a schematic perspective view showing a doctor blade in contact with a papermaking roll.

Referring to FIG. 1, a composite doctor blade 2 is held against a papermaking roll 12, which is rotating about its axis in the direction denoted by arrow 22, such that a leading beveled edge 14 of the doctor blade 2 may remove contaminants from the surface 16 of the roll. In FIG. 1 the machine direction is denoted by arrow 18 and the cross machine direction is denoted by arrow 20. The doctor blades discussed below would be used in the environment and in the manner depicted in FIG. 1.

Figure 2:
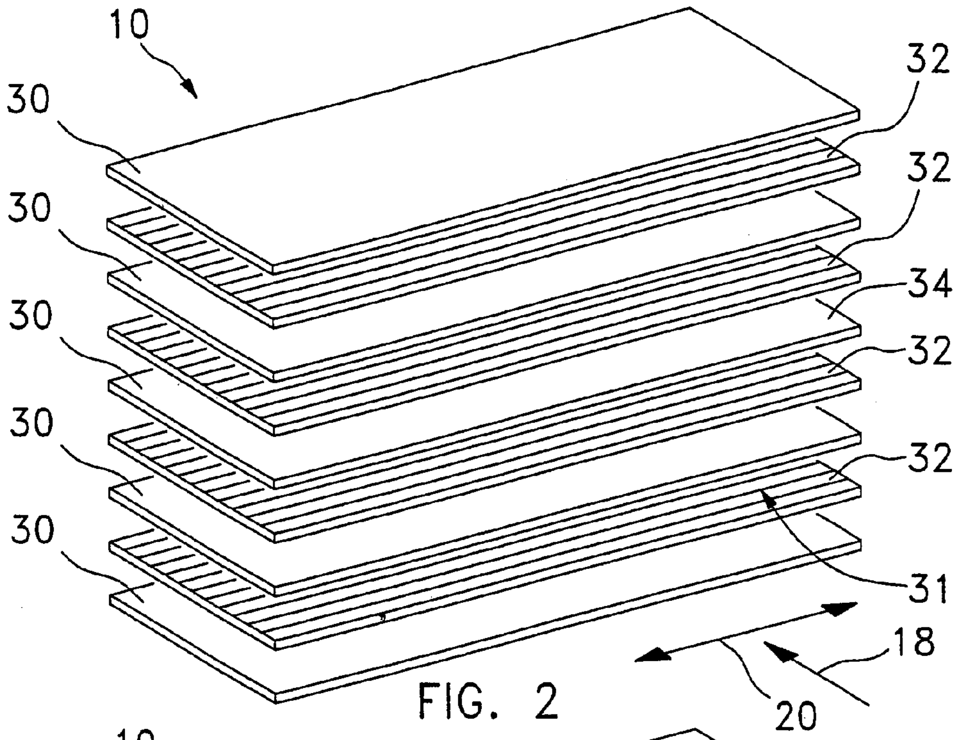
FIG. 2 is an exploded perspective view of a doctor blade according to one embodiment of the invention.
Figure 3:
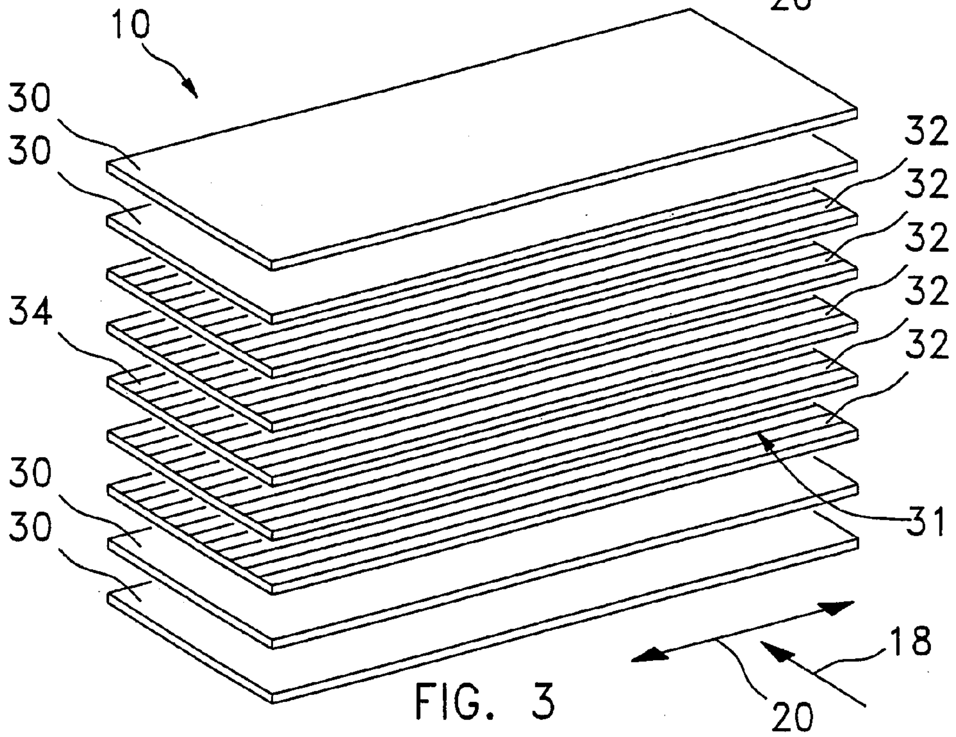
FIG. 3 is an exploded perspective view of a doctor blade according to an alternate embodiment of the invention.

Referring to FIGS. 2 and 3, doctor blade 10 of the invention includes a laminate structure formed from multiple layers of composite material 32, each layer including a plurality of unidirectional fibers 31, and a plurality of reinforcement fibrous layers 30. The composite material layers 32 are arranged within the laminate structure such that the unidirectional fibers 31 are aligned in a direction substantially parallel to the long axis of the doctor blade 10. Reinforcement layers 30 differ from composite material layers 32 in that the majority of the fibers in the reinforcement layers are not oriented parallel to the long axis of the doctor blade 10. Reinforcement layers 30 may be included in the laminate structure to provide reinforcement, e.g., stiffness or strength, or to increase the thickness of the doctor blade. Reinforcement layers 30 are shown schematically, without indicating the direction of the fibers, in FIGS. 2 and 3. Reinforcement layers 30 can have a woven or nonwoven structure and the fibers may be aligned substantially in the machine direction or in two or more directions.

FIG. 2 and FIG. 3 illustrate embodiments of the doctor blade of the invention that include nine layers. Typically composite doctor blades will include five to twenty layers but may include more layers depending on the thickness desired for the doctor blade 10. As will be understood by practitioners skilled in the art, the appropriate number of layers for a composite doctor blade is determined by the operating requirements of the particular doctoring application. Each composite material layer 32 and reinforcement layer 30 is impregnated with an epoxy or thermoplastic resin such that the layers may be laminated, i.e., bonded under pressure and temperature, together to form a single laminate structure.

As shown in FIG. 2, the laminate structure of one embodiment of the doctor blade 10 may be formed from alternating reinforcement layers 30 and composite layers 32. Preferably the reinforcement layers 30 include fiberglass fibers aligned in two or more directions in a woven structure. The embodiment of the doctor blade 10 shown in FIG. 2 would be suitable for doctoring applications requiring a relatively high level of abrasiveness, such as the calendering of a coated paper web having a relatively high moisture content, e.g., about 4 to 10%, which tends to cause increased build-up of coating particles on the roll surface.

FIG. 3 shows an alternate embodiment of the doctor blade 10 in which composite material layers 32 are core layers and the reinforcement layers 30 are outer layers. Preferably the reinforcement layers 30 include carbon fibers. The embodiment of the doctor blade 10 of the invention shown in FIG. 3 would be appropriate for a doctoring application demanding a less abrasive blade, such as an on-line calendering unit where the paper web is relatively dry, e.g., about 1 to 4% moisture content, and tends to cause minimal contamination of the roll surface.

The arrangement of the layers within the laminate structure of the doctor blade 10 is generally symmetrical around the central core layer 34, shown as a reinforcement layer 30 in FIG. 2 and as a composite material layer 32 in FIG. 3. If the arrangement of the layers is not symmetrical about the central core layer 34, the doctor blade may bend or twist along its long axis.

Suitable fibers for the composite material layers 32 include fiberglass, ceramic fibers, and mixtures thereof, preferably fiberglass. As used herein, the term "fiber" is intended to encompass an individual filament or a multifilament strand having a length greater than its width. The composite material layers may include relatively short fibrous segments or long continuous fibers, i.e., fibers that run the length of the doctor blade. Preferably, the composite material layers include predominantly long continuous fibers.

Suitable fibers for the composite material layers are sufficiently abrasive to materials typically used to form the surface of papermaking rolls, e.g., cast iron, chilled iron, cast steel, or a thermal spray coating including a ceramic or metal matrix material, so that they will clean and/or reduce the roughness of the roll surface. Suitable fibers for the composite material layers are generally sufficiently rigid so as to provide strength in the longitudinal direction to the doctor blade. If the fibers comprising the composite material layers are not sufficiently rigid, the flexibility of the doctor blade itself will increase, which may result in ineffectual doctoring of the roll surface because the doctor blade will tend to flex when pressure is applied to clean the roll surface.

The unidirectional fibers are generally provided in the form of a fabric. Suitable fabrics including unidirectional fibers are generally referred to in the art as "unidirectional fabrics" even though such fabrics may have woven structures such that a certain proportion of the fibers are aligned in a different direction. As used herein, the term "secondary fibers" is intended to refer to the fibers included in the unidirectional fabric but are not aligned in a direction substantially parallel to the long axis of the doctor blade. Secondary fibers are generally used in unidirectional fabric to provide a rudimentary framework for the unidirectional fibers so that the fabric does not fall apart during processing, e.g., during impregnation with resin and during lamination. Such secondary fibers tend to be abrasive to materials typically used to form the surface of papermaking rolls. Suitable unidirectional fabrics contain at least 60% by weight unidirectional fibers. Preferably, at least 75% by weight of the unidirectional fabric are unidirectional fibers, most preferably 90% by weight.

Unidirectional fabrics preferably have a woven structure, so that the fabric is able to retain its shape through impregnation with resin and the manufacture of the doctor blade. During manufacture of the doctor blade, large sheets of unidirectional fabric, and, if desired, reinforcement layers, are impregnated with resin. After impregnation, the impregnated layers are layered so that multiple layers are superimposed on top of one another to form a laminate structure. The laminate structure is then subjected to an elevated temperature and pressure to cure the resin and bond the layers together. The cured laminate structure is then cut into two or more doctor blades, each blade having a long axis.

The unidirectional fabric may further include a small proportion of nonabrasive fibers, such as carbon, rayon, cotton, aramid, i.e., aromatic polyamide, polyester and mixtures thereof. Such nonabrasive fibers may be used to provide other properties such as reduced abrasiveness or structural strength. The nonabrasive fibers may be aligned fully in the cross machine or the machine direction, or in more than one direction. Orientation of the nonabrasive fibers becomes important when they are used to provide strength to the doctor blade structure. For instance, an embodiment of the invention may have carbon fibers woven into the unidirectional fabric in order to reduce the abrasiveness of the doctor blade and to provide strength. If strength is needed in the long axis of the blade, the carbon fibers should extend in a direction substantially parallel with the long axis. If strength is needed across the width of the doctor blade, the carbon fibers extend in a direction substantially perpendicular to the long axis. If the nonabrasive fibers have a glass transition temperature, Tg, it should be greater than the surface temperature of the roll against which the doctor blade is applied. If the Tg of the fibers is equal to or less than the temperature of the roll surface, the fibers tend to melt and contaminate the roll surface. Practitioners skilled in the art are aware of how to select appropriate nonabrasive fibers exhibiting the properties desired for a particular doctoring application such as reduced abrasiveness and/or increased strength.

When using some conventional composite doctor blades, coating particles and contaminants removed from the surface of a roll tend to plug up crevices and interstices between the fibers of the working surface of the doctor blade, i.e., the surface of the blade that is against the roll surface, reducing the effectiveness of the blade. Doctor blade 10 tends to exhibit less "plugging up" with particles and contaminants because there are fewer crevices and interstices available due to the cross machine orientation of the unidirectional fibers. The composite material layers 32 (FIG. 2 and FIG. 3) also expose a greater surface area of fiber to the roll surface because the unidirectional fibers are aligned in the cross machine direction, parallel to the roll surface upon which they are acting. During operation, the unidirectional fibers at the working surface of the doctor blade tend to disintegrate, exposing adjacent unidirectional fibers. This disintegration provides a refreshed working surface on the beveled edge 14 (FIG. 1) of the doctor blade. The unidirectional fibers typically disintegrate into very small particles which are removed from the roll surface with the doctored contaminants.

Conventional composite doctor blades often have a propensity to form scratches on the surface of the roll because the "ends" of the abrasive fibers are acting upon the surface of the roll. Because a significant proportion of the fibers in a typical doctor blade are aligned in the machine direction, the surface of the roll is subjected to doctoring by the "ends" of the fibers rather than the "sides" of the fibers. Under near continuous doctoring conditions, such action by the fiber ends tends to increase the roughness of the roll surface significantly, eventually causing an unacceptable deterioration in roll surface and final product properties.

Figure 4A:
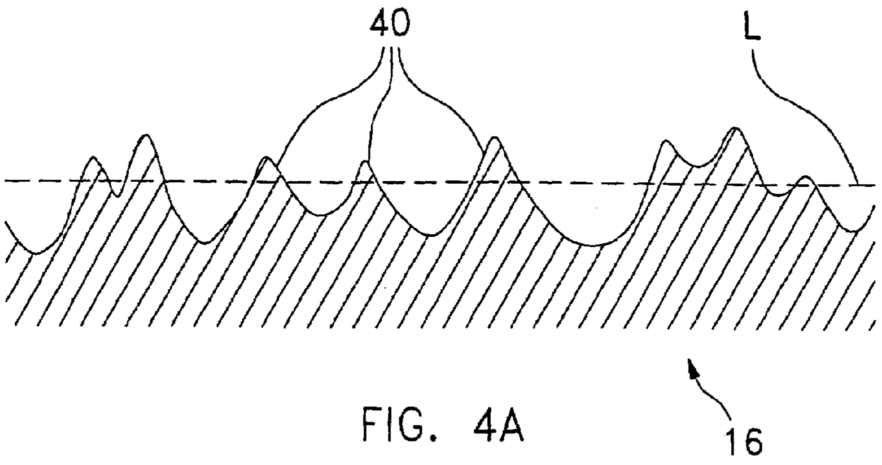
FIGS. 4A and 4B are highly enlarged schematic cross-sectional views of a papermachine roll, showing the surface before and after the use of an embodiment of the invention.
Figure 4B:
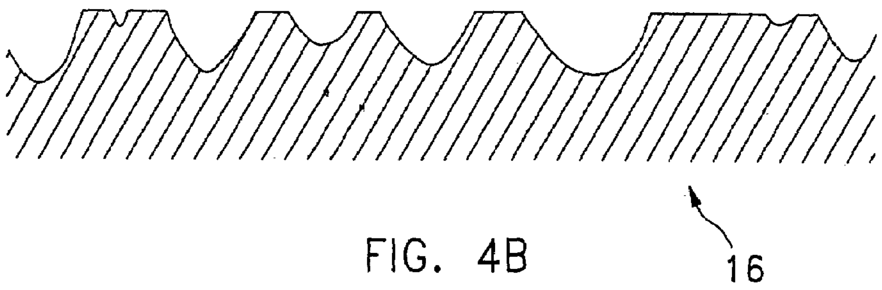

While doctor blades of the invention may include secondary fibers or nonabrasive fibers aligned in the machine direction, the propensity to form scratches is significantly reduced because there are fewer fibers in the machine direction, and therefore, fewer fiber "ends" acting upon the roll surface. The composite material layers of the doctor blade of the invention tend to reduce the roughness of the roll surface, as shown in FIG. 4A and FIG. 4B. FIG. 4A is a roll profile of a section of the surface 16 of roll 12 (FIG. 1) before the use of an embodiment of doctor blade 10, providing a magnified view of the peaks and valleys caused by contaminants and/or the ends of fibers aligned in the machine direction. FIG. 4B shows the roll profile of the same section of roll surface 16 after the use of an embodiment of doctor blade 10. The action of doctor blade 10 on the roll surface 16 tends to remove the tops 40 of the peaks to a uniform level L, resulting in a decrease in surface roughness. Embodiments of doctor blade 10 may reduce the surface roughness of the roll about also be used to maintain the surface roughness of the roll during the effective life of a blade at a level of about 0.025 to 0.20 μm Ra, preferably about 0.050 to 0.13 μm Ra. The level of surface roughness achievable through use of the doctor blade of the invention will depend on the materials used to form the surface of papermaking rolls and the operating conditions of the particular doctoring application.

The greater surface area of unidirectional fiber exposed in the composite layers also provides a more uniform abrasive surface with which to doctor the surface of the roll. A more uniform abrasive surface generally results in a more uniform roll surface profile. Because a greater area of abrasive material, i.e., the longitudinal length of the unidirectional fibers, is exposed during doctoring, the doctor blade also wears more slowly and uniformly.

Preferred unidirectional fabrics tend to have a relatively open structure, woven in the plain weave style, in which the unidirectional and secondary fibers cross alternatively. Unidirectional fabrics are available in weaves having different degrees of openness. The weight per unit area of a unidirectional fabric provides an indication of the openness of the weave. The weight per unit area of the unidirectional fabrics is preferably about 230 to 610 $g/m^2$. A loose, low weight weave tends to be less abrasive and to disintegrate faster than a tighter, high weight weave under the same operational demands. However, higher weight unidirectional fabrics may be more suitable in doctoring applications requiring a more abrasive blade to prevent rapid disintegration that would result in significant wear of the blade and a shorter blade life.

A loose, low weight unidirectional fabric tends to be more suitable for doctoring applications requiring a less abrasive blade, such as an uncoated paper web having a low moisture level that creates relatively little contamination of the roll surface. A tighter, high weight unidirectional fabric tends to be more suitable for doctoring applications requiring high abrasiveness and high resistance to wear, such as a coated paper web having a high moisture level that creates significant contamination of the roll surface. In a tighter, high weight material there is an increased proportion of secondary fiber "ends" per unit area of material exposed to the roll surface. A tighter, high weight material will exhibit a high abrasiveness per unit area because kinks are created in the unidirectional fibers as they weave over and under the secondary fibers, exposing a greater surface area of abrasive material. Practitioners skilled in the art would understand how to determine whether a particular weave is loose or tight using the guidelines provided above.

The diameters of the unidirectional fibers tend to be greater than the diameters of the secondary fibers. The diameters of the unidirectional fibers may be equal to or greater than, preferably greater than, the diameters of the secondary fibers. Preferably, the diameters of the unidirectional fibers are about 450 to 1500 μm, and the diameters of the secondary fibers are about propensity to form scratches on the surface of the roll, and the width of such scratches, is increased.

Suitable unidirectional fabrics including a plurality of unidirectional fibers are available from Fibre Glast Developments Corporation, Brookville, Ohio, e.g., 1093 E-Glass Fabric, and from Brunswick Technologies Inc., Brunswick, Me., e.g., E-LPb 425 and E-LPb 567 0° Uni-Directional fabrics.

Suitable impregnating resins include a thermoplastic or epoxy resin. Preferably, an epoxy resin system, comprising an epoxy resin and a curing agent, or hardener, is employed to form the laminate structure of the doctor blade of the invention. Resins used in the doctor blade of the invention are selected to withstand the operating temperatures used in the particular doctoring application. During operation, the resin used to manufacture the doctor blade will be in contact with the surface of the roll. The resin used should not melt and contaminate the roll surface but should wear away exposing the unidirectional fibers. Because the resin is not abrasive, it is preferable that the resin wears away faster than the unidirectional fibers.

The glass transition temperature, Tg, of the resin provides an indication of the operating temperatures it is designed to withstand. Resins suitable for use in the doctor blade of the invention have a Tg of about 55 to 315° C., depending on the temperature of the roll surface to be doctored. For high temperature calendering applications, preferred resins are epoxy resins having a Tg ranging from about 65 to 315° C., more preferably about 85 to 315° C. If the Tg of the cured resin is too low for a particular doctoring application, the resin tends to melt and contaminate the surface of the roll. A resin with a high Tg would generally be an unnecessary expense for a doctor blade used against a roll operating at a relatively low temperature.

Suitable epoxy resin systems are commercially available from Fiber Glast Developments Corporation, e.g., the System 2000 Epoxy Resin used with 2020, 2060, or 2120 Epoxy Hardeners, and from Resolution Performance Products, Houston, Tex., e.g., EPON Resin 828 used with EPI-CURE Curing Agent 9552 or EPON Resin 862 used with EPI-CURE Curing Agent W. Alternatively, an epoxy resin such as EPON Resin 828 or EPON Resin 826, manufactured by Resolution Performance Products, may be cured by other curing agents, such as ETHACURE 100 Curative, available from Albemarle Corporation, Baton Rouge, La., or methylene dianiline. Practitioners skilled in the art are aware of how to select an appropriate resin exhibiting a Tg suitable for a particular doctoring application and for ease of use, e.g., the time required to cure and safety precautions.

The doctor blade of the invention includes about 50 to 75% fibrous material by weight, preferably about 60 to 70%, and about 25 to 50% resin by weight, preferably about 30 to 40%. As the percentage of fibrous material in the doctor blade increases, the Tg of the doctor blade tends to increase because the fibrous materials tend to have higher glass transition temperatures than the resins. The doctor blade of the invention should have a Tg of about 75 to 315° C., depending on the temperature of the roll surface to be doctored. For high temperature calendering applications, the Tg of the blade preferably is about 100 to 315° C., more preferably about 150 to 315° C. An increased proportion of fibrous material also tends to increase the abrasiveness of the doctor blade.

Typically, the thickness of each layer prior to bonding into the laminate structure ranges from about 0.20 to 0.50 mm for the composite material layers, and from about 0.09 to 0.50 mm for the secondary layers. The thickness of the doctor blade 10 may range from about 1.50 to 3.20 mm, depending on the location of the doctor blade within the papermaking process and the operating conditions to which it is subjected. Thinner doctor blades tend to clean the surface of rolls more effectively over the life of the blade. Because the beveled edge of a thinner blade is generally thinner than the beveled edge of a thick blade, it provides a higher pressure per unit area than the beveled edge of a thick blade. Thicker doctor blades tend to have greater mechanical strength and longer blade life. The width of the doctor blade is also dependent on the location of the doctor blade within the papermaking process and the operating conditions to which it is subjected, and may range from about 50 to 100 mm. Practitioners skilled in the art are aware of how to select the appropriate doctor blade thickness and width that balances the desired life of the doctor blade and level of contamination of the roll surface.

The resin used to impregnate the composite fibrous layers may include abrasive additives, such as glass microspheres, glass fibers, crushed glass, synthetic or industrial diamond particles, silica particles, silicon carbide particles, boron particles, zirconium particles, aluminum oxide particles and mixtures thereof. The impregnating resin may also include friction reducing additives, such as carbon particles and powdered polytetrafluoroethylene. Reducing the friction between the doctor blade and the surface of the roll tends to reduce the heat generated during doctoring thereby extending the life of the doctor blade. Practitioners skilled in the art are aware of how to select suitable additives to meet the requirements of a particular doctoring application, e.g., to increase or decrease abrasiveness or reduce friction, and to achieve the desired final product attributes.

The reinforcement layers generally include carbon fibers, aramid fibers, ceramic fibers, fiberglass and mixtures thereof, preferably fiberglass. The reinforcement layers may have a woven or nonwoven structure and the fibers may be aligned substantially in the machine direction or in two or more directions. A woven structure tends to provide a greater level of abrasiveness than a nonwoven structure. The reinforcement layers may be woven in a plain, satin or twill weave style, preferably a plain or satin weave. Preferably, the weight per unit area of the reinforcement layers is about 60 to 350 g/m$^2$.

Reinforcement layers comprising carbon fibers are typically used to reduce friction and to increase the strength of the doctor blade in the machine direction. Carbon fibers are characterized by high tensile strength and high stiffness but they are not considered abrasive. Therefore, although the ends of the carbon fibers may act upon the roll surface, they do not tend to form scratches in the roll surface. Aramid fibers may be used to provide tensile strength and abrasion resistance to the doctor blade. Ceramic or fiberglass reinforcement layers provide additional abrasiveness to the doctor blade. In view of the guidance above, practitioners skilled in the art would understand how to select the appropriate composition and number of the reinforcement layers within the laminate structure to meet the requirements of a particular doctoring application, e.g., to reduce friction, to increase stiffness or to increase abrasiveness.

Suitable materials for the reinforcement layers are available from Fibre Glast Developments Corporation, e.g., 241 Woven Fiberglass Fabric, 530 3K Graphite Fabric, and 549 5HS Kevlar® Fabric, and from Brunswick Technologies Inc., e.g., CBX 300 6k Carbon and ARBX 350 Aramid fabrics.

Figure 5:
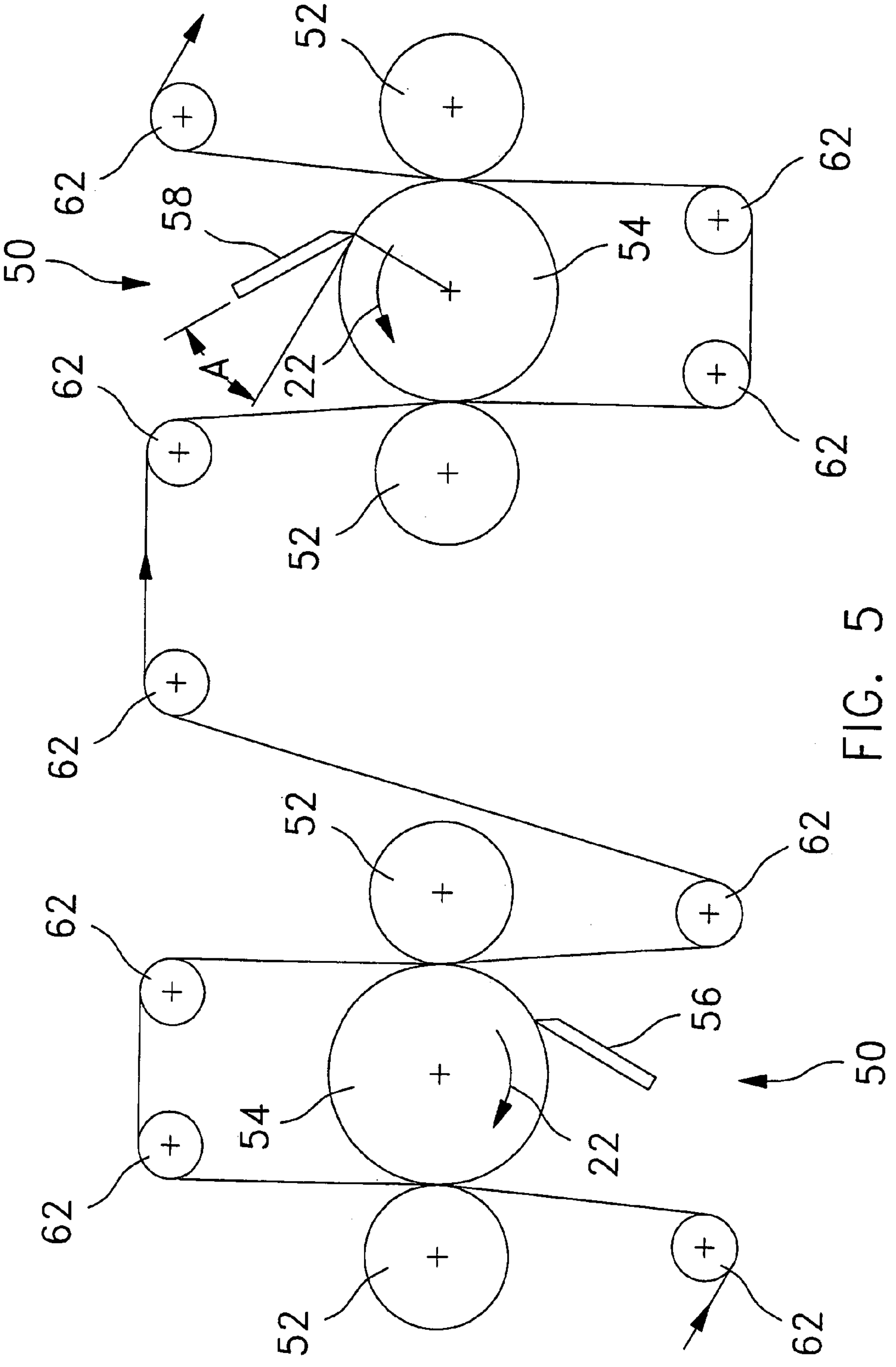
FIG. 5 is a schematic side view of a calendering unit showing a method of using a doctor blade embodying the invention.

A typical on-line calender is shown in FIG. 5, including two units 50, each unit including two soft rolls 52 and one metal roll 54. The soft rolls 52 are typically comprised of a resilient or yieldable material, such as fiber reinforced epoxy resin. Metal roll 54 may be comprised of cast iron, chilled iron, ductile iron, forged steel or cast steel. Metal roll 54 may be further coated with a thermal spray coating comprising a ceramic or metal matrix material, e.g., a carbide containing metal matrix material. The thickness of a thermal spray coating is typically about 75 to 305 μm. Generally the thermal spray coating is capable of being ground to a roughness of less than about 0.20 μm Ra. The direction of rotation for each metal roll 54 is denoted by arrow 22. A paper web 60 is passed through the calender units 50, with the aid of guide rolls 62.

Two doctor blades are used, a first doctor blade 56 positioned against the metal roll 54 of the first unit 50, and a second doctor blade 58 positioned against the metal roll 54 of the second unit 50. The doctor blades 56 and 58 may be located anywhere on the circumference of the metal roll 54, provided that the beveled edge 14 (FIG. 1) operates against the rotational direction of the metal roll, as shown in FIG. 5. Preferably, each doctor blade is positioned after the paper web 60 has passed through both nips of each unit 50 formed by the soft rolls 52 and the metal roll 54. Such a location ensures that the doctor blade cleans the metal roll after one full pass of the paper web. Practitioners skilled in the art are aware of the most appropriate location for a doctor blade taking into account unique operational considerations, such as the process path of the paper web and instrumentation or other equipment in the vicinity of the roll to be doctored, safety considerations, and maintenance considerations.

The beveled edge 14 (FIG. 1) is typically cut at a 45° angle from the horizontal plane formed by the base of the doctor blade. The operating angle A, of the doctor blades 56 and 58 should generally range between about 25 to 30°, measured from the horizontal formed by a tangential line to the surface of the roll where the beveled edge of the doctor blade is positioned. The pressure of the doctor blade against the roll is typically about 85 to 700 N/m, preferably about 175 to 440 N/m.

The doctor blades 56 and 58 may be applied intermittently to the surface of the metal roll 54 for specific cleaning activities. It is generally preferable that the doctor blades are applied to the surface of the metal roll 54 on a substantially continuous basis while the roll is in operation. Use of the doctor blade on a near continuous basis ensures that abrasive contaminants are continuously removed from the surface of the roll. Consequently, deterioration of the roll surface is significantly reduced. Such use on a substantially continuous basis also tends to reduce the roughness of the roll surface and to maintain a consistent roll profile. Reducing surface deterioration, reducing the surface roughness and maintaining a consistent profile tend to result in consistent product quality at a high production rate with greater efficiency. The ability to minimize deterioration of the roll surface and to maintain the desired level of roughness tends to increase the life of the roll, or in the case of a thermal spray coated roll, the life of the surface coating.

The first calendering unit 50 generally requires a more abrasive doctor blade 56, such as the embodiment depicted in FIG. 2, because the paper web has just been coated with a paper coating and dried, and, therefore, tends to contain more moisture. High moisture levels in the paper and paper coating increase the likelihood of adhesion of the paper web to the metal roll 54, resulting in hazing, i.e., a thin layer of coating particles adhering to the surface of the roll. Hazing reduces the transfer of heat from the surface of the roll to the paper which reduces the gloss levels of the paper web. Hazing also increases the roughness of the roll surface which also reduces the gloss levels of the paper. If a less abrasive blade is used in the first unit, pressure of the doctor blade against the face of the roll tends to be increased in an effort to scrape the residue off the roll surface. Increased blade pressure tends to decrease the life of a doctor blade.

A less abrasive doctor blade 58, such as the embodiment shown is FIG. 3, is typically employed for the second unit 50 because the paper web is drier and adhesion to the metal roll 54 is reduced. Because the roll is relatively clean of contaminants, the pressure of a more abrasive blade against the roll must be controlled closely to prevent excessive roll wear. If a more abrasive doctor blade is used against the roll, an excessive amount of the roll surface may be removed, decreasing the life of the roll surface. As discussed above, the abrasiveness of the doctor blade is typically affected by the use and composition of reinforcement layers, abrasive additives, the ratio of resin to fibrous material, and the openness of the weave for the composite material.

EXAMPLE

Composite doctor blades including 7 layers were manufactured using 4 reinforcement layers and 3 composite material layers. The laminate structure was formed from alternating reinforcement and composite material layers, as depicted in FIG. 2 where the outer layers and the core layer are formed from reinforcement layers. The reinforcement layers were formed from a fiberglass fabric, woven in a plain weave style, supplied by Essco, Inc. The unidirectional fabric used in composite material layers was 1093 E-Glass Fabric, a fiberglass fabric in which 95% by weight are unidirectional fibers, available from Fibre Glast Developments Corporation. The impregnating resin was an epoxy resin, supplied by Essco, Inc., and had a Tg of about 90 to 115° C. The doctor blades were used in the second calender unit, similar to the second unit 50 shown in FIG. 5. The pressure of the doctor blade against the metal calender roll, which was coated with a thermal spray coating, was about 350 N/m and the operating angle was about 27°. The roughness of the surface of the roll after doctor blades had been applied against the surface of the roll on a substantially continuous basis for about 21 days was about 0.05 to 0.08 μm Ra. After an additional 27 days, the roughness of the surface of the roll was about 0.08 to 0.13 μm Ra. Surface roughness was measured using the Surtronic 3+ instrument, manufactured by Taylor Hobson Inc., Rolling Meadows, Ill. While the surface roughness of the roll increased slightly, the level of roughness remained very low, indicating minimal deterioration of the roll surface. The surface roughness obtained by the doctor blades would be considered advantageous for the manufacture of coated printing papers. The doctor blades each had a life of about 5 to 7 days, which would be considered an acceptable level of resistance to wear when used on a substantially continuous basis.

Other embodiments are within the claims. For instance, the doctor blades of the invention are suitable for use in other web manufacturing industries which employ rolls, e.g., printing, polymer film, flooring, and textile. Various modifications of this invention will become apparent to those skilled in the art without departing from the scope or spirit of this invention.

What is claimed is:

1. A method of making a composite doctor blade having a long axis comprising impregnating a composite material comprising unidirectional fibers with a resin, wherein the unidirectional fibers are aligned in a direction parallel to the long axis of the doctor blade and are provided in a unidirectional fabric that includes, based on fabric weight, at least 60% by weight unidirectional fibers.

2. A method of claim 1 further comprising superimposing multiple layers of composite material on top of one another to form a laminate structure.

3. A method of claim 1 further comprising curing the resin by subjecting the impregnated composite material to an elevated temperature and pressure.

4. A method of claim 3 further comprising cutting the cured composite material into 2 or more doctor blades.

5. The method of claim 1 wherein the unidirectional fibers are selected from the group consisting of fiberglass, ceramic, and mixtures thereof.

6. The method of claim 5 wherein the unidirectional fibers comprise fiberglass.

7. The method of claim 5 wherein the unidirectional fibers comprise long continuous fibers.

8. The method of claim 1 wherein at least 75% by weight of the unidirectional fabric comprises unidirectional fibers.

9. The method of claim 8 wherein at least 90% by weight of the unidirectional fabric comprises unidirectional fibers.

10. The method of claim 1 wherein the unidirectional fabric further comprises secondary fibers.

11. The method of claim 10 wherein the unidirectional fibers have diameters equal to or greater than the diameters of the secondary fibers.

12. The method of claim 11 wherein the diameters of the unidirectional fibers are about 450 to 1500 $\mu$m and the diameters of the secondary fibers are about 400 to 700 $\mu$m.

13. The method of claim 1 wherein the unidirectional fabric further comprises nonabrasive fibers.

14. The method of claim 13 wherein the nonabrasive fibers are selected from the group consisting of carbon, rayon, aramid, polyester, and mixtures thereof.

15. The method of claim 14 wherein the nonabrasive fibers comprise carbon fibers aligned in a direction substantially perpendicular to the long axis of the doctor blade.

16. The method of claim 1 wherein the unidirectional fabric has a weight per unit area of about 230 to 610 g/$m^2$.

17. The method of claim 1 wherein the resin comprises a thermoplastic resin.

18. The method of claim 17 wherein the resin comprises an epoxy resin.

19. The method of claim 18 wherein the resin has a glass transition temperature of about 65 to 315° C.

20. The method of claim 19 wherein the resin has a glass transition temperature of about 85 to 315° C.

21. The method of claim 17 wherein the resin further comprises an abrasive additive selected from the group consisting of glass microspheres, glass fibers, crushed glass, synthetic or industrial diamond particles, silica particles, silicon carbide particles, boron particles, zirconium particles, aluminum oxide particles and mixtures thereof.

* * * * *